Jan. 18, 1927.

C. T. ROTTLER 1,614,691

BORING MACHINE

Filed August 18, 1925

Clarence T. Rottler INVENTOR

Albert H. Adams BY

ATTORNEY

Patented Jan. 18, 1927.

1,614,691

UNITED STATES PATENT OFFICE.

CLARENCE T. ROTTLER, OF SEATTLE, WASHINGTON.

BORING MACHINE.

Application filed August 18, 1925. Serial No. 50,967.

In rotary cutting devices that are employed in connection with the reboring of cylinders such, for example, as the cylinders of an internal combustion engine, there is comprised a spindle to one end of which is removably secured a suitable cutter head. Such a spindle is ordinarily formed from a smooth-surfaced cylindrical bar and is supported in a vertical position by a long stationary bushing through which the spindle passes and in which it has a close working fit. Although it is, of course, intended that in the use of such a tool the wall of the cylinder being bored shall be concentric at all times with the axis of the spindle yet it is found in practice, even with the most accurate adjustment of the tool with respect to the bore of the cylinder, that upon the completion of the boring operation and when the cutter head is attempted to be drawn up out of the bore such head will engage more or less with some portion of the cylinder wall, with the result that the surface of the wall will be scored or scratched by the knives of the head as the head is being withdrawn. The leading object of my invention is to provide a construction of tool that will permit the raising of the head to be accomplished without liability of marring or damaging the wall of the cylinder by contact of the cutting members of the head therewith. Other objects of the invention are to provide means for ensuring a positive downward movement of the cutter head at all times while the spindle is being rotated during the cutting operation; to so connect the spindle and its bushing together that they will rotate in unison while the cutter head is functioning but, when it is desired to draw the head out of a cylinder upon the completion of the work therein, the spindle may be quickly pulled lengthwise of its bushing to the required extent. These objects I attain by the construction and arrangement of parts shown in the drawing and hereinafter more particularly described. That which I believe to be new will be set forth in the claims.

Figures 1, 2, 3, 4:
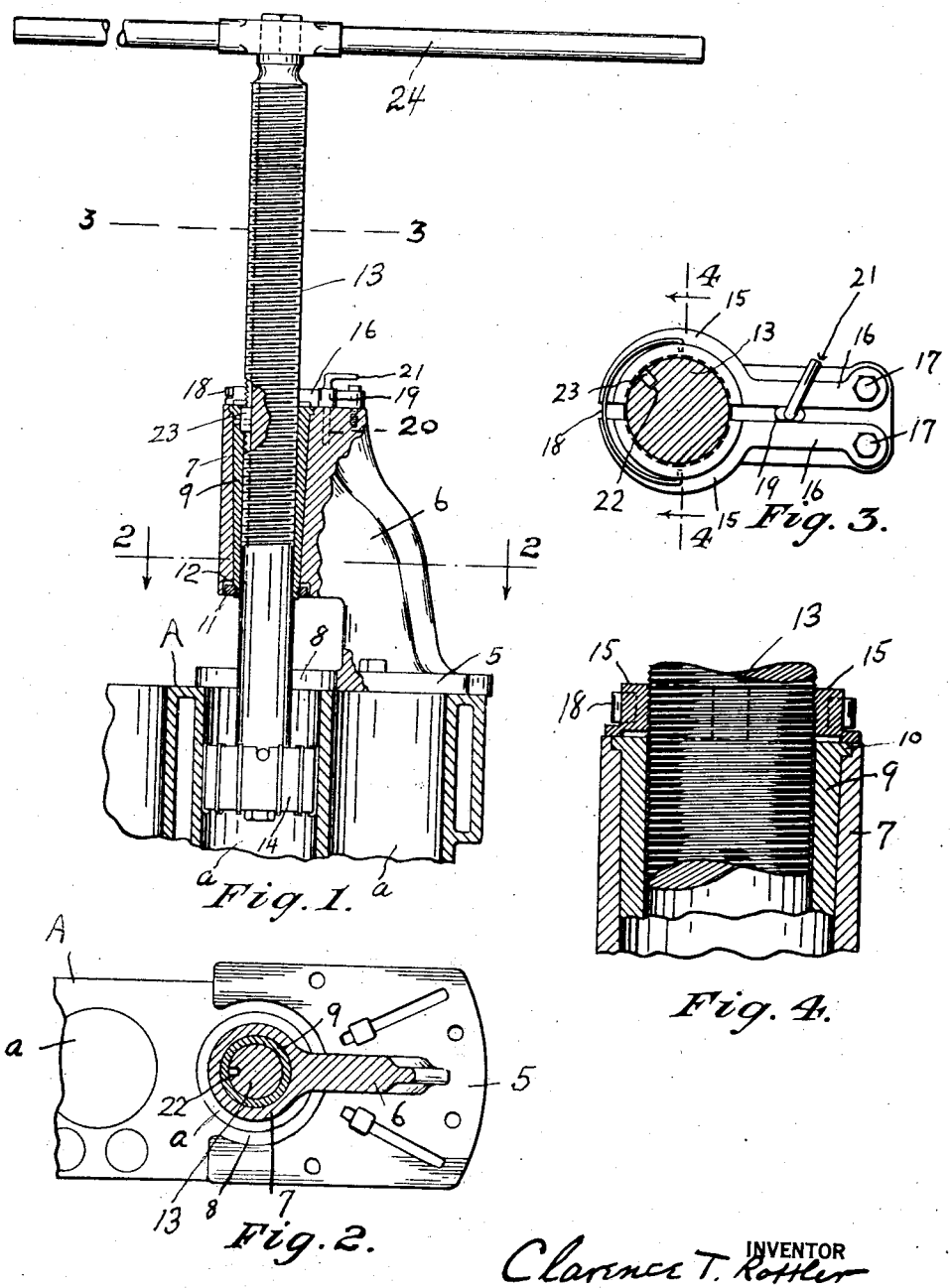
Fig. 1 is a view partly in elevation and partly in vertical section of a boring device embodying my invention, a portion of a cylinder block being also shown, to which block the device is secured and in one of the cylinders of which the boring head is located—some portions being partly broken away.
Fig. 2 is a cross-section taken at line 2—2 of Fig. 1.
Fig. 3 is an enlarged cross-section taken at line 3—3 of Fig. 1.
Fig. 4 is a detail, being an enlarged section taken at the line 4—4 of Fig. 3.

Referring to the several figures of the drawing:—5 indicates a base plate from which rises a heavy standard 6 that carries a depending sleeve 7, the bore of which gradually tapers from the upper to the lower end. The base 5 has formed through it at one end a circular opening 8 adapted to lie over the upper end of a cylinder that is to be rebored. Preferably the members 5, 6 and 7 will be formed integral with each other, and through the base 5 will be formed slots or other openings, as usual, for the passage of bolts for securing the device in proper operative position upon a cylinder block. The portion of a cylinder block that is shown in the drawing is indicated by A and the cylinders therein by $a$.

In the sleeve 7 is located a bushing 9 whose outer face is tapered to correspond to and fit against the wall of the tapering bore of the sleeve 7. The bore of the bushing, however, is cylindrical, and notwithstanding that a screw-threaded spindle passes through the bushing, as hereinafter described, the inner face of this bushing is not threaded. As shown, at the upper end of the bushing there is provided an annular flange 10, best shown in Fig. 4, that normally rests upon a shoulder formed adjacent to the upper end of the sleeve 7, and, as shown in Fig. 1, the lower end portion of the bushing is slightly diminished in diameter and made cylindrical and upon such end portion a screw-thread is cut to adapt a nut 11 to be screwed thereon. As shown, the lower end portion of the sleeve 7 is provided with an annular recess in its inner wall adapted not only to receive the nut 11 when such nut is screwed up tightly on the threaded lower end of the bushing but to leave a small space, as indicated in Fig. 1, between such nut and the shoulder 12 that forms the upper wall of such recess. Normally such space will be left between the said nut and shoulder but when the bushing is moved upward, as will be the case after the completion of the boring operation and as described hereinafter, then it is evident that such nut 11 will abut against the shoulder and thus limit the extent of movement of said bushing.

13 indicates a spindle extending through the bushing 9 and having removably affixed to its lower end in any approved manner a boring head 14 of any desired construction. I have not attempted to show the detailed construction of a boring head but preferably a head will be employed constructed as shown and described in Letters Patent No. 1,522,145, granted to me on the 6th day of January, 1925. The spindle 13 is formed of a cylindrical rod, which, as shown in Fig. 1, is screw-threaded throughout the greater part of its length. As heretofore stated the cylindrical bore of the bushing is left plain or unthreaded, and the diameters of the threaded spindle and the unthreaded bore are such that while the spindle has at all times a close working fit in the bore it is not too tight a fit to prevent the spindle being moved longitudinally therethrough when its thread is not co-operating with the threaded member that I shall now refer to. Such member, as best shown in Fig. 3, is in the form of a two-part ring, and to each of which similar ring parts I have applied the reference numeral 15. The inner faces of these curved sections are screw-threaded so that when the sections are closed around and held against the spindle they will, as will be understood, operatively engage therewith. In order that these sections may be swung into and out of engagement with the spindle each is provided with an arm 16 that is pivoted at 17 adjacent to its outer end to the upper face of the standard 6. In the construction shown a curved spring 18 that engages with the two members 15, 15, tends to hold those members in screw-threaded engagement with the spindle, and such engagement can be broken as desired by the turning of a cam 19 located between the arms 16, which cam is secured upon a pivot pin 20 journaled in an opening in the top of the standard 6, such pivot pin having a turned end that constitutes a handle 21. The spindle 13 and its bushing 9 are so connected together that they will rotate together during the boring operation but the connection is such that it will not prevent the independent endwise movement of the spindle when such spindle is being adjusted to a position to commence the boring of a cylinder or when withdrawing the cutter head from a cylinder after the boring or cutting operation has been completed. Such connecting of these parts together is accomplished by providing the spindle with a longitudinal groove 22 into which projects a pin or key 23 that has a sliding fit therein. To the upper end of the spindle is affixed, in the construction shown, a handle-bar 24, by which power may be manually applied to rotate the spindle.

In use, the base is to be so secured to a cylinder block as to bring the cutter-head 14 in proper position to enter one of the cylinders thereof. With the curved screw-threaded sections 15 held out of engagement with the spindle it is evident that the spindle can be moved freely longitudinally to bring the cutter-head into proper relation to the cylinder and when that has been accomplished a turn of the cam 19 to the position shown in Fig. 3 will permit the curved spring to draw the ring sections 15 into screw-threaded engagement with the spindle. Thereafter the boring operation is performed as usual by the rotation of the spindle, either by means of the handle-bar shown or by a power mechanism such as is commonly employed for the purpose. The bushing 9 being connected, in the manner described, with the spindle it necessarily rotates with the spindle, and such wear as takes place will be between the tapered surfaces of the sleeve 7 and bushing 9 and also between the flange 10 and the shoulder upon which it bears. By reason of the tapering surfaces of the bushing and its sleeve the wear of the parts is, of course, compensated for by the very gradual downward movement of the bushing and hence the perfect fit of the cutter-head in the cylinder is maintained, which is at times not the case where the spindle rotates in a fixed bushing or bearing and the friction or wear is between the spindle and such bushing.

After the boring operation has been completed and it is desired to withdraw the cutter-head from the cylinder the ring members are drawn out of engagement with the screw-threads of the spindle by turning the cam 19 as hereinbefore described, and thereupon the spindle is adapted for free longitudinal movement upward through the bushing. However, whatever the cause may be, it is a fact as demonstrated by long experience, that notwithstanding the great accuracy with which the cutter-head has fitted in and moved down the cylinder there is almost always a tendency for such head to catch or bind at some spot or place on the cylinder wall, and when the head is pulled out with that condition prevailing a scratching or scoring of the cylinder wall will occur. Owing to the close working fit between the screw-threaded spindle and the bore of the bushing there is found to be sufficient friction between the spindle and the bushing to cause the bushing to move upward when the spindle is started to be pulled up. The extent of such upward movement of the bushing is, of course, very slight owing to the fact that the nut 11 on its lower end will abut against the adjacent shoulder on the sleeve 7. Slight though such movement is it has been found in practice that it is sufficient to allow the cutter head to move laterally to the very small extent required to wholly free itself from the spot or place on the wall of the cylinder that it had tended to adhere to and that thereafter it could be moved up and out of the cylinder without liability of scratching or scoring such wall. In the construction shown this slight upward movement is permitted owing to the under faces of the ring members 15 being sufficiently recessed as shown to receive the end of the bushing when such members are turned into inoperative or open position as before described.

By my invention I provide a boring tool having a positive screw feed, means for so compensating for wear as to preserve the operating parts at all times in proper operative position, and means for ensuring the withdrawal of the cutter-head from a cylinder without liability of scratching or otherwise marring the smooth wall of such cylinder.

While my invention has been shown and described in connection with the reboring of engine cylinders it is not to be understood as limited to such use as it can be availed of in connection with other work where it is desirable that the tool carried at the end of the spindle be allowed a slight amount of lateral play before being drawn away from the article that it has been engaged in working upon, and the claims are to be construed accordingly.

What I claim as new and desire to secure by Letters Patent is as follows:

1. The combination with a support and a rotatable tapered bushing carried thereby and having a limited longitudinal movement therein, said bushing having an unthreaded central passage therethrough, of a threaded spindle having a sliding fit in said passage, means connecting said bushing and spindle together to compel them to rotate in unison but permitting independent longitudinal movement of the spindle, a threaded member adapted to be operatively engaged with or disengaged from said spindle, and means for limiting the longitudinal movement of the bushing in one direction, the smaller end of the bushing being toward the work end of the spindle, whereby the longitudinal movement of the spindle away from the work being done loosens the bushing in its support.

2. The combination with a support and a rotatable tapered bushing carried thereby and having a limited longitudinal movement therein, said bushing having an unthreaded central passage therethrough, of a threaded spindle having a sliding fit in said passage, means connecting said bushing and spindle together to compel them to rotate in unison but permitting independent longitudinal movement of the spindle, a sectional interiorly-threaded collar carried by said support and adapted to be moved into and out of engagement with said spindle, and means for limiting the longitudinal movement of the bushing in one direction, the smaller end of the bushing being toward the work end of the spindle, whereby the longitudinal movement of the spindle away from the work being done loosens the bushing in its support.

3. The combination with a support and a rotatable tapered bushing carried thereby and having a limited longitudinal movement therein, said bushing having an unthreaded central passage therethrough, of a threaded spindle having a sliding fit in said passage, means connecting said bushing and spindle together to compel them to rotate in unison but permitting independent longitudinal movement of the spindle, a threaded member adapted to be operatively engaged with or disengaged from said spindle, and a nut screwed upon the smaller end of said bushing and serving as a stop for limiting the longitudinal movement of the bushing in one direction, the smaller end of the bushing being toward the work end of the spindle, whereby the longitudinal movement of the spindle away from the work being done loosens the bushing in its support.

4. The combination with a support and a rotatable tapered bushing carried thereby, said bushing having a smooth central bore, of a threaded spindle passing through said bore and having frictional contact with the wall thereof, means for connecting said bushing and spindle together so that they will rotate in unison but permitting an independent non-rotating longitudinal movement of the spindle, means for limiting the amount of longitudinal movement of the bushing that is caused by frictional contact of the bushing with the spindle, and threaded means adapted to be engaged by the threaded spindle, the smaller end of the bushing being toward the work end of the spindle, whereby the longitudinal movement of the spindle away from the work being done loosens the bushing in its support.

5. The combination with a support and a rotatable tapered bushing mounted therein, said bushing having a smooth central bore, of a threaded spindle passing through said bore and having frictional contact with the wall thereof, means for connecting said bushing and spindle together so that they will rotate in unison but permitting an independent non-rotating longitudinal movement of the spindle, said bushing being adapted to be given a limited upward movement during the upward movement of the spindle due to the frictional engagement between said spindle and bushing, and threaded means adapted to operatively engage the spindle, the smaller end of the bushing being toward the work end of the spindle, whereby the longitudinal movement of the spindle away from the work being done loosens the bushing in its support.

6. In combination, a vertical tapered support, a tapered bushing therein having an unthreaded bore, a threaded tool-carrying spindle in said bore in frictional contact with the wall of the bore, means for connecting said spindle with said bushing for compelling them to rotate together but permitting independent longitudinal movement of the spindle, a threaded member adapted to operatively engage the spindle, and means for positively preventing beyond a predetermined extent the lifting of the bushing due to its frictional engagement with said spindle, the smaller end of the bushing being toward the work end of the spindle, whereby the longitudinal movement of the spindle away from the work being done loosens the bushing in its support.

CLARENCE T. ROTTLER.